(12) United States Patent
Funakoshi

(10) Patent No.: US 6,757,485 B1
(45) Date of Patent: Jun. 29, 2004

(54) APPARATUS FOR REPRODUCING STILL PICTURE FROM RECORDING MEDIUM

(75) Inventor: Hideaki Funakoshi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 09/549,158

(22) Filed: Apr. 13, 2000

(30) Foreign Application Priority Data

Apr. 15, 1999 (JP) ....................................... P. 11-107983

(51) Int. Cl.⁷ ............................ H04N 9/64; H04N 3/24; H04N 1/405; H04N 1/66
(52) U.S. Cl. ....................... 386/111; 348/714; 348/633; 358/3.1
(58) Field of Search ........................... 386/33, 109, 110, 386/111, 112, 68, 70, 81, 82, 69, 124, 125, 126, 95, 128; 348/7, 12, 13, 714; 358/335, 342, 310; 360/8

(56) References Cited

U.S. PATENT DOCUMENTS 6,501,903 B1 * 12/2002 Yoshimura et al. ............ 386/68

2003/0077069 A1 * 4/2003 Lin et al. ....................... 106/7

FOREIGN PATENT DOCUMENTS

| JP | 10-32821 | 2/1998 |
| JP | 10-271445 | 10/1998 |

* cited by examiner

*Primary Examiner*—Chris Keller
*Assistant Examiner*—Jamie Jo Vent
(74) *Attorney, Agent, or Firm*—Morgan, Lewis & Bockius LLP

(57) ABSTRACT

Compressed audio video data is constituted by a sequence of video information blocks each of which constitutes one unit by a predetermined number of I pictures, a predetermined number of P pictures and a predetermined number of B pictures. In a case of reproducing one of the pictures of the compressed audio video data as a still picture by motion compensation prediction, when a picture stops at the B picture, one of the I pictures closest to the B picture or one of the P pictures closest to the B picture is selected, and the I picture or the P picture thus selected is displayed on a monitor in place of the B picture.

10 Claims, 3 Drawing Sheets

APPARATUS FOR REPRODUCING STILL PICTURE FROM RECORDING MEDIUM

BACKGROUND OF THE INVENTION

The present invention relates to an apparatus for reproducing compressed audio video data recorded on an optical disc such as a CD-ROM, a DVD etc. a DAT or other recording media by motion compensation prediction and, in particular, relates to an apparatus for reproducing a still picture from a recording medium.

MPEG (Moving Picture Experts Group), which is the international standard of the compression/expansion of color motion pictures, has been rapidly spread and applied to computers, communications, broadcastings, entertainment etc. Of MPEG, MPEG1 (MPEG Phase 1) is employed in storage media such as a CD-ROM, a DAT etc. and MPEG2 (MPEG Phase 2) is employed in storage media such as a DVD etc., digital broadcasting, communications etc.

The data arrangement structure (bit stream) of MPEG is formed in a hierarchy structure as shown in FIG. 3. The sequence layer representing the entirety of one video program is constituted by a plurality of GOPs (Group of Picture) 1 each is information block formed on a unit basis of a predetermined number of flames. The GOP layer is constituted by plural pictures 2. The picture layer is constituted by plural slices 3 which are blocks formed by dividing the picture 2. The slice layer is constituted by a plurality of macro blocks (hereinafter called as MBs) 4. The MB layer is constituted by blocks 5 each formed by 8×8 pixels (or scanning lines).

The one block 5 of 8×8 pixels is a minimum unit for coding of MPEG, that is, DCT (Discrete Cosine Transform) processing. The MB 4 is constituted by six blocks in total, that is, four blocks 5 of luminance signal Y and two blocks 5 of color signals $C_B$, $C_R$. The MB 4 is the minimum unit for the motion compensation prediction. The motion vector for the motion compensation prediction is performed on a MB unit basis.

Further, GOP1 includes an intra coded picture (intra coded picture; hereinafter called as an I picture) which is video information being subjected to the intra-frame coding, an predictive coded picture (predictive coded picture; hereinafter called as a P picture) which is video information being subjected to a prediction coding for data in the past-direction, and a bidirectionally predictive coded picture (bidirectionally predictive coded picture; hereinafter called as a B picture) which is video information being subjected to a timely bidirectional prediction coding. As shown in FIG. 4, one GOP 1 is constituted by predetermined numbers of I, P and B pictures which are set in advance.

In the reproduction mode, the respective I, P and B pictures shown in FIG. 4 are sequentially reproduced. In the still picture mode, one of the I, P and B pictures is reproduced as a still picture. In this case, since the prediction methods of the respective I, P and B pictures quite differ from one another as described above, the compression rates of image of these pictures also differ from one another. In the still picture mode, when a picture stops at the picture B having the highest compression rate, the picture quality of this picture is quite degraded as compared with the picture quality of the other I and P pictures when the picture stops at these pictures.

However, in the conventional still picture mode, the picture in a still state is reproduced as a still picture as it is. Thus, there is a problem that when a picture stops at the picture B, the reproduced display image of this picture is quite poor.

Further, since the number of the B pictures is quite larger than those of the I pictures and the P pictures, the probability in the still picture mode that a picture stops at the B picture is higher than the probability that a picture stops at the I picture or the P picture. As a result, the picture quality in the conventional still picture mode is not so good in general.

Such a reproducing method of compressed audio video data of MPEG system is disclosed in Japanese Patent Publications Nos. 10-32821A and 10-271445A, for example. In the former publication, when the MPEG coding image data has data processing information relating to the decoding image data, the decoding image data is monitored on a one-picture frame unit basis of the MPEG coding. The MPEG coding image data relating to the picture frame where the data processing information exists is transmitted on a packet unit basis of the data processing information. Thus, the former publication does not relate to the still picture reproduction.

On the other hand, in the latter publication, when displaying a still picture by the interlace system, a still picture on a frame unit basis and a still picture on a field unit basis are outputted in accordance with the contents of an image recorded on a recording medium, whereby a still picture having no blur and being legible can be provided. Thus, the of the latter publication requires two pictures.

SUMMARY OF THE INVENTION

Accordingly, an object of the present invention is to provide a still picture with good picture quality by simple processing.

In order to achieve the above object, there is provided an apparatus for reproducing a still picture from compressed video audio information including intra coded pictures, predictive coded pictures and bidirectionally predictive coded pictures recorded on a recording medium by selecting one picture from the compressed video audio information by means of a motion compensation prediction, comprising:

a selecting section for, when the reproduction is paused at one bidirectionally predictive coded picture, selecting either one intra coded picture or one predictive coded picture which is closest to the paused bidirectionally predictive coded picture; and a display section for displaying either one intra coded picture or one predictive coded picture selected by the selecting section in place of the paused bidirectionally predictive coded picture.

According to such a configuration, when a picture stops at the bidirectionally predictive coded picture in a still picture mode, the intra coded picture or the predictive coded picture closest to the bidirectionally predictive coded picture is selected, and the intra coded picture or the predictive coded picture thus selected is displayed in place of the bidirectionally predictive coded picture.

Thus, since the intra coded picture or the predictive coded picture having better picture quality is displayed in place of displaying the bidirectionally predictive coded picture which is high in compression rate and not good in picture quality, it is possible to provide a still picture with good picture quality.

Preferably, the selecting section obtains a data difference between the paused bidirectionally predictive coded picture and the intra coded picture closest thereto, and a data difference between the paused bidirectionally predictive coded picture and the predictive coded picture closest thereto. And the selecting section selects one of the intra coded picture and the predictive coded picture having smaller data difference with respect to the paused bidirectionally predictive coded picture.

According to such a configuration, in the case of displaying the intra coded picture or the predictive coded picture in place of displaying the bidirectionally predictive coded picture, since the intra coded picture or the predictive coded picture having a smaller data difference from the bidirectionally predictive coded picture is displayed, a picture having less motion and good picture quality can be displayed as a still picture.

Preferably, the display section displays one of the intra coded picture and the predictive coded picture when the data difference obtained by the selecting section is not larger than a predetermined value. The display section displays the paused bidirectionally predictive coded picture when the data difference is larger than the predetermined value.

When the data difference of the intra coded picture or the predictive coded picture from the bidirectionally predictive coded picture is larger than the allowable value, even if the intra coded picture or the predictive coded picture is displayed in place of the bidirectionally predictive coded picture, it becomes quite difficult to recognize the relation with the bidirectionally predictive coded picture since the motion from the original bidirectionally predictive coded picture is quite large.

According to the above configuration, when the data difference is larger than the allowable value, since the original bidirectionally predictive coded picture is displayed, such a problem caused by displaying the intra coded picture or the predictive coded picture in place of the bidirectionally predictive coded picture can be eliminated that it becomes difficult to recognize the relation with the original bidirectionally predictive coded picture.

Preferably, the reproduction apparatus further comprises an operating section for setting a high quality display mode. The selecting section and the display section is operated only when the high quality display mode is set by the operating section.

According to such a configuration, a still picture with good quality can be displayed by setting the high picture quality display by operating the operation portion only when a user desires.

Preferably, the recording medium is a DVD. In this case, since it is possible to search a picture while looking a still picture with better picture quality at the time of retrieving image recorded on a DVD, a picture can be retrieved quite easily.

According to the present invention, there is also provided a method for reproducing a still picture from compressed video audio information including intra coded pictures, predictive coded pictures and bidirectionally predictive coded pictures recorded on a recording medium by selecting one picture from the compressed video audio information by means of a motion compensation prediction, comprising the steps of:

pausing the reproduction;

determining whether the reproduction has been paused at one bidirectionally predictive coded picture;

selecting either one intra coded picture or one predictive coded picture which is closest to the paused bidirectionally predictive coded picture when the reproduction has been paused at one bidirectionally predictive coded picture; and displaying either one intra coded picture or one predictive coded picture selected by the selecting section in place of the paused bidirectionally predictive coded picture.

Preferably, the reproduction method further comprising the steps of:

obtaining a data difference between the paused bidirectionally predictive coded picture and the intra coded picture closest thereto, and a data difference between the paused bidirectionally predictive coded picture and the predictive coded picture closest thereto; and selecting one of the intra coded picture and the predictive coded picture having smaller data difference with respect to the paused bidirectionally predictive coded picture.

Preferably, the reproduction method, further comprising the steps of:

determining whether the obtained data difference is larger than a predetermined value;

displaying the paused bidirectionally predictive coded picture when the data difference is larger than the predetermined value; and displaying one of the intra coded picture and the predictive coded picture in place of the paused bidirectionally predictive coded picture when the data difference is not larger than the predetermined value.

Preferably, the reproduction method, further comprising the step of setting a high quality display mode. The selecting step and the display step is executed only when the high quality display mode is set.

Preferably, the recording medium is a DVD.

DETAILED DESCRIPTION OF THE PREFERRED EMBODIMENTS

A first embodiment of the present invention to which a DVD reproduction apparatus (hereinafter called as a DVD player) is applied will be explained with reference to FIGS. 1 and 2.

Figure 1:
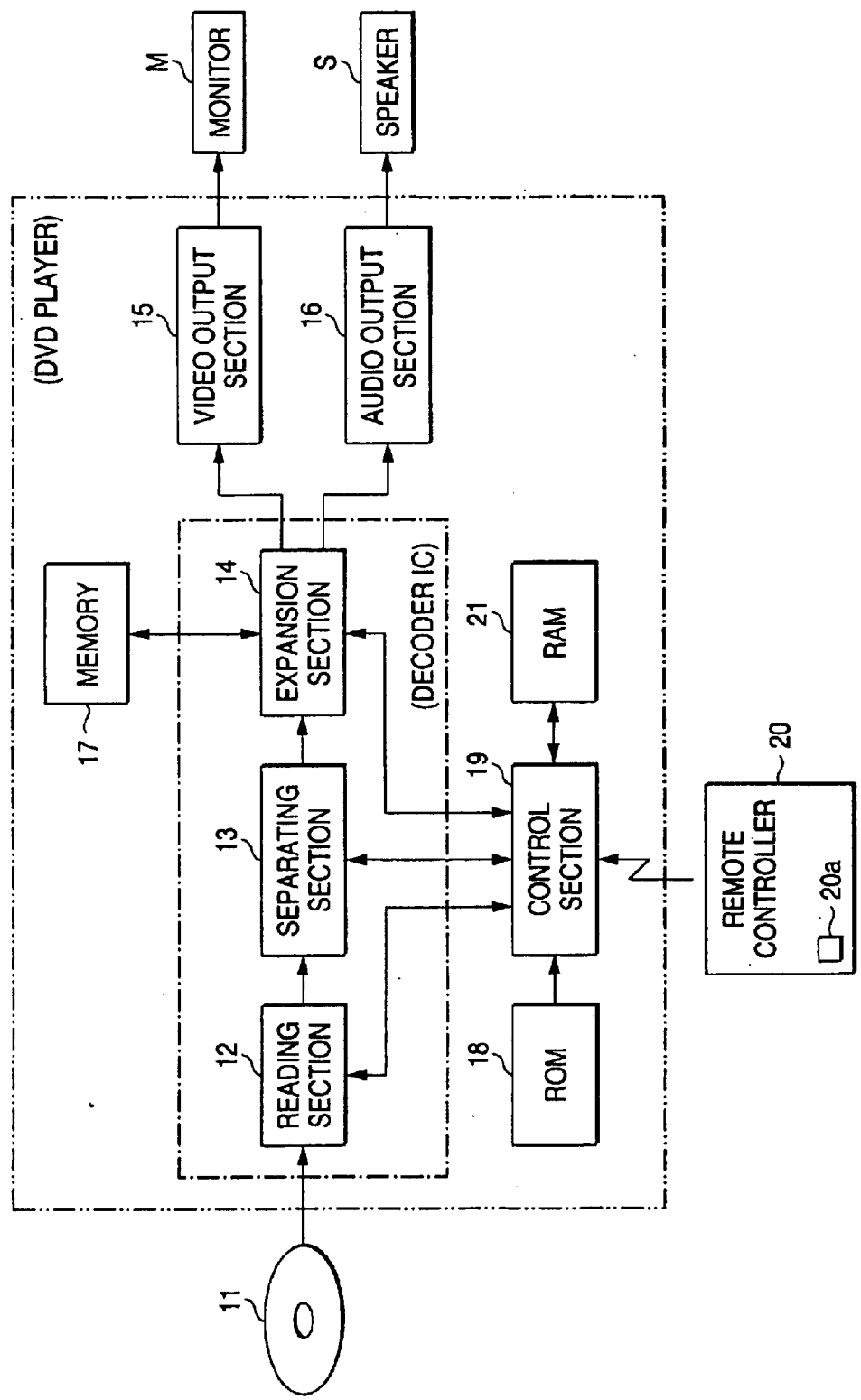
FIG. 1 is a block diagram showing the whole configuration of a reproduction apparatus according to one embodiment of the invention.

In FIG. 1 showing the arrangement of the DVD player, a reference numeral 11 denotes a DVD serving as a recording medium which is rotated and driven by a not-shown drive mechanism. An optical pickup constitutes a reading section 12. A separating section 13 separates compressed audio video data read out from the reading section 12 into compressed video data packets and compressed audio data packets. An expansion section 14 decodes the compressed video data packets and the compressed audio data packets thus separated by the separating section 13 to expand into an original audio video signal. The reading section 12, the separating section 13 and the expansion section 14 are formed by a generally-used decoder IC.

Further, in FIG. 1, a reference numeral 15 denotes a video output section which constitutes a display section together with a monitor M formed by a television etc., for example, and converts the video data thus expanded by the expansion section 14 into a color television signal of NTSC or PAL system and outputs the color television signal so as to display on the monitor M. An audio output section 16 outputs the audio data thus expanded by the expansion section 14 from a speaker S. A memory 17 formed by a RAM etc. temporarily stores the data thus expanded by the expansion section 14. A ROM 18 stores control program of a control section described later. A control section 19 controls the operations of the reading section 12, the separating section 13, the expansion section 14, the video output section 15 and the audio output section 16 as well as the driving system of the DVD 11 in accordance with the key operation of a remote controller 20.

A reference numeral 21 denotes a RAM for temporarily storing the data. These reading section 12, the separating section 13, the expansion section 14, the video output section 15, the audio output section 16, the memory 17, the ROM 18, the control section 19 and the RAM 21 constitute the DVD player.

The remote controller 20 is provided with a still picture mode key 20a serving as an operating section for reproducing a still picture in addition to a reproduction key for performing normal reproduction, a stop key etc. The operation section of the not-shown main body side of the player is also provided with keys similar to the respective keys of the remote controller 20.

In the DVD 11, there is recorded the compressed audio video data constituted by a sequence of video information blocks (see FIG. 2) each of which constitutes one unit by a predetermined number of I pictures, a predetermined number of P pictures and a predetermined number of B pictures. When the reproduction key is operated, these respective pictures are sequentially reproduced, and when the still picture mode key 20a is operated, one of the I, P and B pictures is reproduced as a still picture.

In this case, the control section 19 selects, when a picture stops at a B picture in the still picture mode, an I picture or a P picture closest to the B picture from the memory 17 and controls the video output section 15 to display the selected I picture or P picture. This selecting processing corresponds to a selecting section of the present invention.

Figure 2:
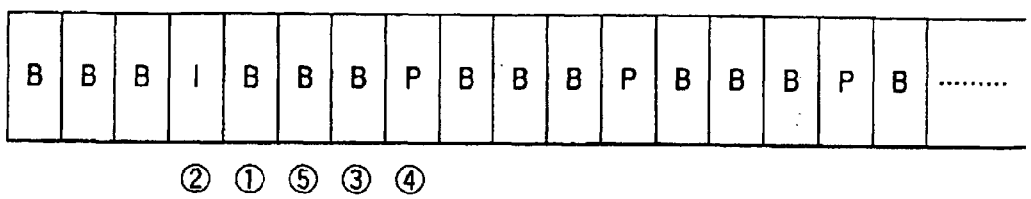
FIG. 2 is a diagram for explaining operations of the reproduction apparatus of FIG. 1.
Figure 3:
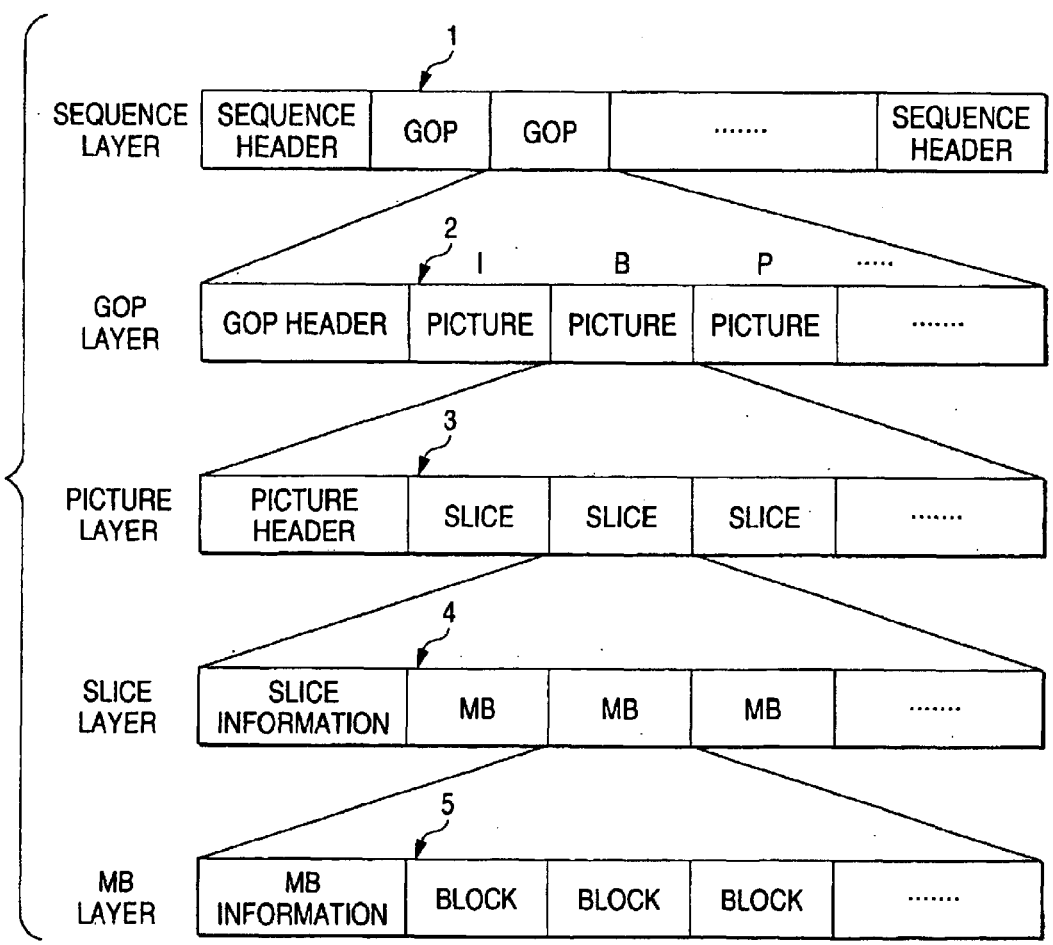
FIG. 3 is a diagram showing a hierarchical data arrangement structure (bit stream) of MPEG.
Figure 4:
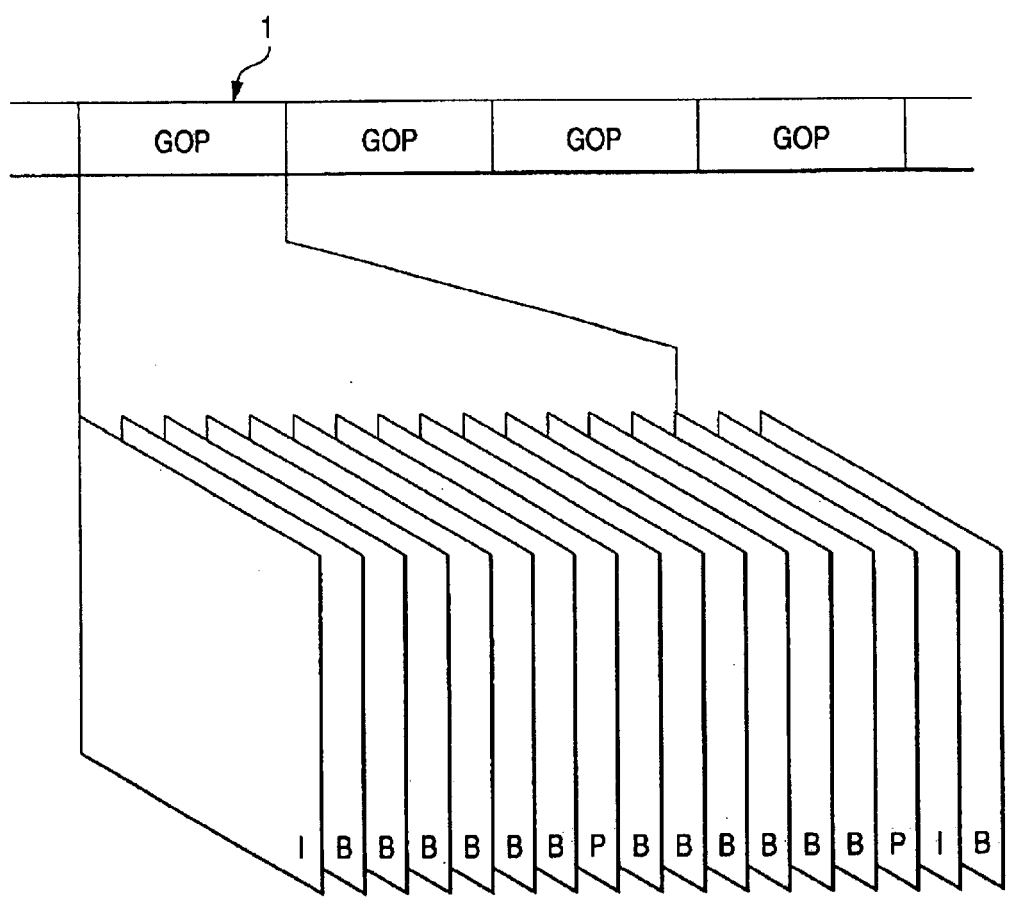
FIG. 4 is a diagram showing a data structure of GOP.

For example, when a picture stops at a B picture shown by ① in FIG. 2, although there are an I picture shown by ② and a P picture shown by ④ as an I picture and a P picture closest to the B picture, respectively, the I picture shown by ② is closer to the B picture than the P picture shown by ④. Thus, the I picture shown by ② is selected from the memory 17 and displayed as a still picture whereby the I picture having better picture quality than the B picture is displayed on the monitor M.

Further, when a picture stops at a B picture shown by ③ in FIG. 2, although there are an I picture shown by ② and a P picture shown by ④ as an I picture and a P picture closest to the B picture, respectively, the P picture shown by ④ is closer to the B picture than the I picture shown by ②. Thus, the P picture shown by ④ is selected from the memory 17 and displayed as a still picture whereby the P picture having better picture quality than the B picture is displayed on the monitor M.

Incidentally, when a picture stops at a I picture or a P picture, the I picture or the P picture thus stopped is displayed on the monitor M as a still picture as it is.

Thus, according to the first embodiment, in the still picture mode, since an I picture or a P picture having better picture quality than a B picture is displayed in place of displaying a B picture which is high in compression rate and not good in picture quality, it is possible to provide a still picture with good picture quality.

Since such a still picture with good quality can be displayed, an image can be retrieved quite easily when retrieving an image recorded on the DVD 11.

As a second embodiment of the invention, the control section 19 serving as the selecting section may be operated in the following manner. That is, when a picture stops at a B picture in the still picture mode, the control section obtains a data difference between the B picture and an I picture closest thereto and a data difference between the B picture and a P picture closest thereto, then selects one of the I and P pictures having the smaller data difference from the B picture thus obtained, and controls the video output section 15 to display the selected I picture or P picture as a still picture on the monitor M.

For example, when a picture stops at a B picture shown by ⑤ in FIG. 2, although there are an I picture shown by ② and a P picture shown by ④ as an I picture and a P picture closest to the B picture, respectively, each of the I picture and the P picture separates from the B picture shown by ⑤ by the same amount. Thus, one of these I and P pictures can not be selected by the selecting method in the first embodiment.

Therefore, in this embodiment, a data difference between the B picture shown by ⑤ and the I picture shown by ② and a difference between the B picture and the P picture shown by ④ are obtained, then one of the I and P pictures having the smaller data difference from the B picture thus obtained is selected from the memory 17 and displayed on the monitor M as a still picture.

Thus, since one of the I and P pictures having the smaller data difference from the B picture is displayed at a time of displaying the I picture or the P picture in place of displaying the B picture, a picture having less motion and good picture quality can be displayed on the monitor M as a still picture, so that a picture can be retrieved more easily.

As a third embodiment, the control section 19 serving as the selecting section may be operated in the following manner. That is, when a picture stops at a B picture in the still picture mode, the control section obtains a data difference between the B picture and an I picture closest thereto and a data difference between the B picture and a P picture closest thereto. Then, the control section selects one of the I and P pictures having the smaller data difference from the B picture thus obtained when each of the data differences is equal to or less than an allowable value set in advance, and selects the B picture as it is when each of the data differences is larger than the allowable value.

In this case, when the data difference of the I picture or the P picture from the B picture is larger than the allowable value, even if the I picture or the P picture is displayed in place of the B picture, it becomes quite difficult to recognize the relation with the B picture since the motion from the original B picture is quite large.

Thus, when the data difference of the I picture or the P picture from the B picture is larger than the allowable value, since the original B picture is displayed as it is, such a problem caused by displaying the I picture or the P picture can be eliminated that it becomes difficult to recognize the relation with the B picture.

As a fourth embodiment, of course, an I picture or a P picture closest to a B picture may be selected and displayed only when a high picture quality display key separately provided at the remote controller 20 and the operating section of the main body side is operated, or one of I and P pictures having the smaller data difference from a B picture may be displayed in place of displaying the B picture, or the selection manner of the pictures may be changed depending on whether the data difference of an I picture or a P picture from a B picture closest thereto is larger than the allowable value or not.

In this manner, when the high picture quality display key is provided, a picture with good quality can be displayed as a still picture by operating the high picture quality display key only when a user desires, so that a still picture suited to the user's preference can be displayed.

Although the aforesaid embodiments are explained as to the case where a DVD is employed as a recording medium and the invention is applied to a DVD player, the recording medium is not limited to a DVD. That is, the recording medium may be any one which stores compressed audio video data accorded to MPEG2 and reproduces the data by the motion compensation prediction and the invention can be applied to any apparatus which at least is able to reproduce such a recording medium.

Further, the invention is not limited to the aforesaid respective embodiments and various changes in the arrangement thereof may be resorted to without departing from the spirit and the scope of the invention.

What is claimed is:

1. An apparatus for reproducing a still picture from compressed video audio information including intra coded pictures, predictive coded pictures and bidirectionally predictive coded pictures recorded on a recording medium by selecting one picture from the compressed video audio information by means of a motion compensation prediction, comprising:

a selecting section for, when the reproduction is paused at one bidirectionally predictive coded picture, selecting either one intra coded picture or one predictive coded picture which is closest to the paused bidirectionally predictive coded picture; and a display section for displaying either one intra coded picture or one predictive coded picture selected by the selecting section in place of the paused bidirectionally predictive coded picture.

2. The reproduction apparatus as set forth in claim 1, wherein the selecting section obtains a data difference between the paused bidirectionally predictive coded picture and the intra coded picture closest thereto, and a data difference between the paused bidirectionally predictive coded picture and the predictive coded picture closest thereto; and wherein the selecting section selects one of the intra coded picture and the predictive coded picture having smaller data difference with respect to the paused bidirectionally predictive coded picture.

3. The reproduction apparatus as set forth in claim 2, wherein the display section displays one of the intra coded picture and the predictive coded picture when the data difference obtained by the selecting section is not larger than a predetermined value; and wherein the display section displays the paused bidirectionally predictive coded picture when the data difference is larger than the predetermined value.

4. The reproduction apparatus as set forth in claim 1, further comprising:

an operating section for setting a high quality display mode, wherein the selecting section and the display section is operated only when the high quality display mode is set by the operating section.

5. The reproduction apparatus as set forth in claim 1, wherein the recording medium is a DVD.

6. A method for reproducing a still picture from compressed video audio information including intra coded pictures, predictive coded pictures and bidirectionally predictive coded pictures recorded on a recording medium by selecting one picture from the compressed video audio information by means of a motion compensation prediction, comprising the steps of:

pausing the reproduction;

determining whether the reproduction has been paused at one bidirectionally predictive coded picture;

selecting either one intra coded picture or one predictive coded picture which is closest to the paused bidirectionally predictive coded picture when the reproduction has been paused at one bidirectionally predictive coded picture; and displaying either one intra coded picture or one predictive coded picture selected by the selecting section in place of the paused bidirectionally predictive coded picture.

7. The reproduction method as set forth in claim 6, further comprising the steps of:

obtaining a data difference between the paused bidirectionally predictive coded picture and the intra coded picture closest thereto, and a data difference between the paused bidirectionally predictive coded picture and the predictive coded picture closest thereto; and selecting one of the intra coded picture and the predictive coded picture having smaller data difference with respect to the paused bidirectionally predictive coded picture.

8. The reproduction method as set forth in claim 7, further comprising the steps of:

determining whether the obtained data difference is larger than a predetermined value;

displaying the paused bidirectionally predictive coded picture when the data difference is larger than the predetermined value; and displaying one of the intra coded picture and the predictive coded picture in place of the paused bidirectionally predictive coded picture when the data difference is not larger than the predetermined value.

9. The reproduction method as set forth in claim 6, further comprising the step of setting a high quality display mode, wherein the selecting step and the display step is executed only when the high quality display mode is set.

10. The reproduction method set forth in claim 6, wherein the recording medium is a DVD.

* * * * *